US007716186B2

(12) United States Patent  (10) Patent No.: US 7,716,186 B2
Cannon et al.  (45) Date of Patent: May 11, 2010

(54) METHOD AND SYSTEM FOR TRANSPARENT BACKUP TO A HIERARCHICAL STORAGE SYSTEM

(75) Inventors: David Maxwell Cannon, Tucson, AZ (US); Barry Fruchtman, Tucson, AZ (US); Michael Harry Segapeli, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 11/625,418

(22) Filed: Jan. 22, 2007

(65) Prior Publication Data

US 2008/0177806 A1  Jul. 24, 2008

(51) Int. Cl.
 G06F 7/00 (2006.01)
 G06F 17/30 (2006.01)
(52) U.S. Cl. .................... 707/651; 707/653; 707/652; 707/670
(58) Field of Classification Search .......... 707/200–204
See application file for complete search history.

(56) References Cited

U.S. PATENT DOCUMENTS

| 6,397,308 B1 | 5/2002 | Ofek et al. | |
| 6,434,681 B1 | 8/2002 | Armangau | 711/162 |
| 6,549,992 B1 | 4/2003 | Armangau et al. | 711/162 |
| 7,065,610 B1 | 6/2006 | Black | 711/114 |
| 7,089,293 B2 | 8/2006 | Grosner et al. | 709/217 |
| 7,222,168 B2* | 5/2007 | Kitamura et al. | 709/223 |
| 2002/0107877 A1* | 8/2002 | Whiting et al. | 707/204 |
| 2005/0138195 A1* | 6/2005 | Bono | 709/231 |
| 2005/0193235 A1 | 9/2005 | Sandorfi et al. | |
| 2006/0080370 A1 | 4/2006 | Torii et al. | 707/204 |
| 2006/0112219 A1* | 5/2006 | Chawla et al. | 711/114 |
| 2007/0198601 A1* | 8/2007 | Prahlad et al. | 707/201 |
| 2007/0214384 A1* | 9/2007 | Kitamura | 714/13 |
| 2008/0016390 A1* | 1/2008 | Cannon et al. | 714/6 |

OTHER PUBLICATIONS

ADSTAR Distributed STorage Manager Using the Application Program Interface, Version 3 Release 1, IBM, Jan. 1999, pp. 1-217.

* cited by examiner

*Primary Examiner*—Etienne P LeRoux
*Assistant Examiner*—Cindy Nguyen
(74) *Attorney, Agent, or Firm*—Kunzler Needham Massey & Thorpe (57) ABSTRACT

A method and system are disclosed for transparent backup to a hierarchical storage system. A data management application requests a backup operation, communicating the request using the Network Data Management Protocol with a tape server and a data server. The tape server generates a unique identifier for the data set. In addition, the tape server transfers the data set from the data server to the hierarchical storage system and sends the identifier to the data management application in response to the request. The identifier identifies the data set within the hierarchical storage system. In a certain embodiment, the tape server stores and manages the data set in locations transparent to the data management application. The tape server and data management application may be logically distinct. The data management application may access the data set through the tape server using the identifier.

15 Claims, 7 Drawing Sheets

_METHOD AND SYSTEM FOR TRANSPARENT BACKUP TO A HIERARCHICAL STORAGE SYSTEM_

BACKGROUND OF THE INVENTION

1. Field of the Invention

This invention relates to backup operations and more particularly relates to transparent backup to a hierarchical storage system.

2. Description of the Related Art

Data processing systems regularly store data of great worth to an organization. The data may be organized as one or more data sets. The data sets may include database files, linked data arrays, flat files, and the like. A data processing system may back up the data sets to a remote storage device to preserve the data sets in case the data sets stored within the data processing system are lost or corrupted. For example, a data management application executing on the data processing system may back up a plurality of data sets from a data source of a data server to a remote storage device such as a magnetic tape drive.

The data management application may use the Network Data Management Protocol (NDMP) from the NDMP Initiative to back up one or more data sets to a remote data storage device. NDMP provides the data management application with functions for backing up data sets and restoring the data sets. For example, the data management application may use NDMP tape server to back up and/or restore data sets to a magnetic tape drive. As used herein, magnetic tape drives are referred to as tape drives.

Unfortunately, NDMP tape server requires the data management application to perform storage management processes for the tape drive. Thus the data management application must identify a volume, select a tape drive, mount the tape, position the tape, specify an offset and size for a data set, direct the reading of the data set, and dismount the tape to retrieve the data set from the magnetic tape.

The requirements of an NDMP tape server make it difficult for the data management application to track and manage data sets stored to a remote storage device such as a tape drive. In addition, the data management application must be configured to perform data management tasks to preserve, manage, and restore the data sets.

SUMMARY OF THE INVENTION

From the foregoing discussion, there is a need for a method and system for transparent back up to a hierarchical storage system (HSS) and recovery from the HSS. Beneficially, such a method and system would allow a data management application to transparently back up data to a HSS using NDMP without also needing to manage storage used for the backup.

The present invention has been developed in response to the present state of the art, and in particular, in response to the problems and needs in the art that have not yet been fully solved by currently available backup methods. Accordingly, the present invention has been developed to provide a method and system for transparently backing up data to a HSS that overcome many or all of the above-discussed shortcomings in the art.

The method of the present invention is presented for transparent backup to a HSS. A data management application requests a backup operation, communicating the request using the NDMP with a tape server and a data server. In one embodiment, the data management application sends data characteristics of the data set to the tape server. The tape server generates a unique identifier for the data set. In addition, the tape server transfers the data set from the data server to the HSS and sends the identifier to the data management application in response to the request. The identifier identifies the data set within the HSS.

The data management application may receive the identifier. In a certain embodiment, the tape server stores and manages the data set in locations transparent to the data management application. The tape server and data management application may be logically distinct. The data management application may access the data set through the tape server using the identifier. The method transparently backs up the data set to the HSS. In addition, the method allows access to the data set using the identifier.

A system of the present invention is also presented for transparent backup to a HSS. The system may be embodied in a data processing system. In particular, the system, in one embodiment, includes a HSS, a data server, a data management application, and a tape server. The system may implement the method described above.

The HSS stores and manages data in a plurality of logical and physical storage locations that are organized in a hierarchy. The data server stores data to a data source. The data management application requests a backup operation, communicating with the tape server and the data server using the NDMP to complete the request.

In one embodiment, the data management application sends data characteristics of the data set to the tape server. The tape server generates a unique identifier for a data set. In addition, the tape server transfers the data set from the data server to the HSS and sends the identifier to the data management application in response to the request. The identifier identifies the data set within the hierarchical storage system.

In a certain embodiment, the tape server stores and manages the data set in locations transparent to the data management application. The tape server and data management application may be logically distinct. The data management application may access the data set through the tape server using the identifier. The system backs up the data set to the HSS, allowing the data set to be managed within the HSS transparently to the data management application.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention transparently backs up and manages one or more data sets to a HSS. The data sets may be managed and accessed using an identifier, so that storage-related processing for backing up, managing, and accessing the data sets is transparent to a data management application. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
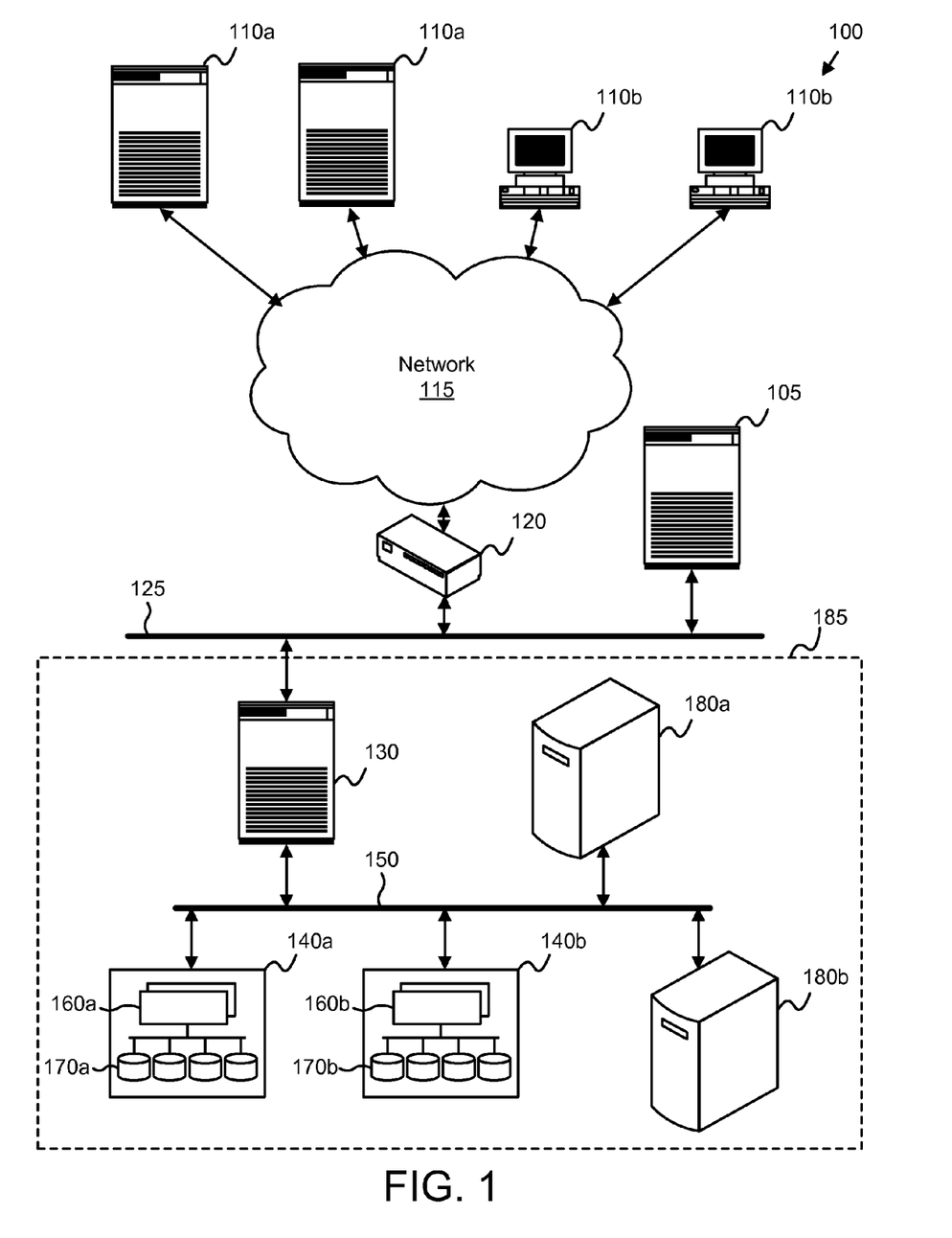
FIG. 1 is a schematic block diagram illustrating one embodiment of a data processing system in accordance with the present invention.

FIG. 1 is a schematic block diagram illustrating one embodiment of a data processing system (DPS) 100 in accordance with the present invention. The DPS 100 includes a computer 105, one or more client servers 110a, one or more client computers 110b, a network 115, a router 120, an internal network 125, a server 130, a storage communications channel 150, one or more storage subsystems 140, and one or more tape drives 180.

As used herein, the client servers 110a and client computers 110b are referred to as clients 110. The server 130 may also be configured as a mainframe computer, a blade center comprising multiple blade servers, and the like. Although for simplicity one computer 105, four clients 110, one network 115, one router 120, one internal network 125, one server 130, one storage communications channel 150, two storage subsystems 140, and two tape drives 180 are shown, any number of computers 105, clients 110, networks 115, routers 120, internal networks 125, servers 130, storage communications channels 150, storage subsystems 140, and tape drives 180 may be employed. One of skill in the art will also readily recognize that the DPS 100 could include other data processing devices such as bridges, scanners, and the like.

Each storage subsystem 140 includes one or more storage controllers 160 and one or more storage devices 170. The storage devices 170 may be hard disk drives, optical storage devices, micromechanical storage devices, holographic storage devices, and semiconductor storage devices. The tape drives 180 may store data to and retrieve data from magnetic tapes. The tape drives 180 may be stand-alone tape drives 180. Alternatively, the tape drives 180 may be embodied in a tape library as is well known to those of skill in the art.

In one embodiment, the server 130, storage subsystems 140, and tape drives 180 are configured as a HSS 185. The HSS 185 may provide data backup and storage services for the clients 110. For example, a client 110 may back up data to a tape drive 180 by communicating the data through the network 115, the router 120, the internal network 125, the server 130, and the storage communications channel 150 to the tape drive 180. If the client 110 requires the backup data in the future, the tape drive 180 communicates the data to the client 110 to restore the data.

The computer 105 may execute a data management application as will be described hereafter. Although the computer 105 is shown in communication with the internal network 125, one of skill in the art will recognize that the computer 105 may communicate with the HSS 185 and the clients 110 through alternate communication channels.

The data management application may employ NDMP to transfer one or more data sets from a client 110 to a tape drive 180. Unfortunately, in the past, the data management application must manage the details of transferring the data sets. For example, the data management application may identify a target volume for the data sets, select a tape drive, mount the magnetic tape containing the volume, position the tape, and specify an offset and size for writing each data set. In addition, the data management application may direct the mounting of the magnetic tape, direct the reading of each data set, and dismount the tape to retrieve the data sets from the magnetic tape.

The present invention provides a method and system for transparently backing up data sets to and restoring data sets from the HSS 185 as will be described hereafter that frees the data management application from managing storage for the data sets. Thus the data management application may back up data sets to and recover the data sets from the HSS 185, while the details of any backup, management, and recovery operations are transparent to the data management application.

Figure 2:
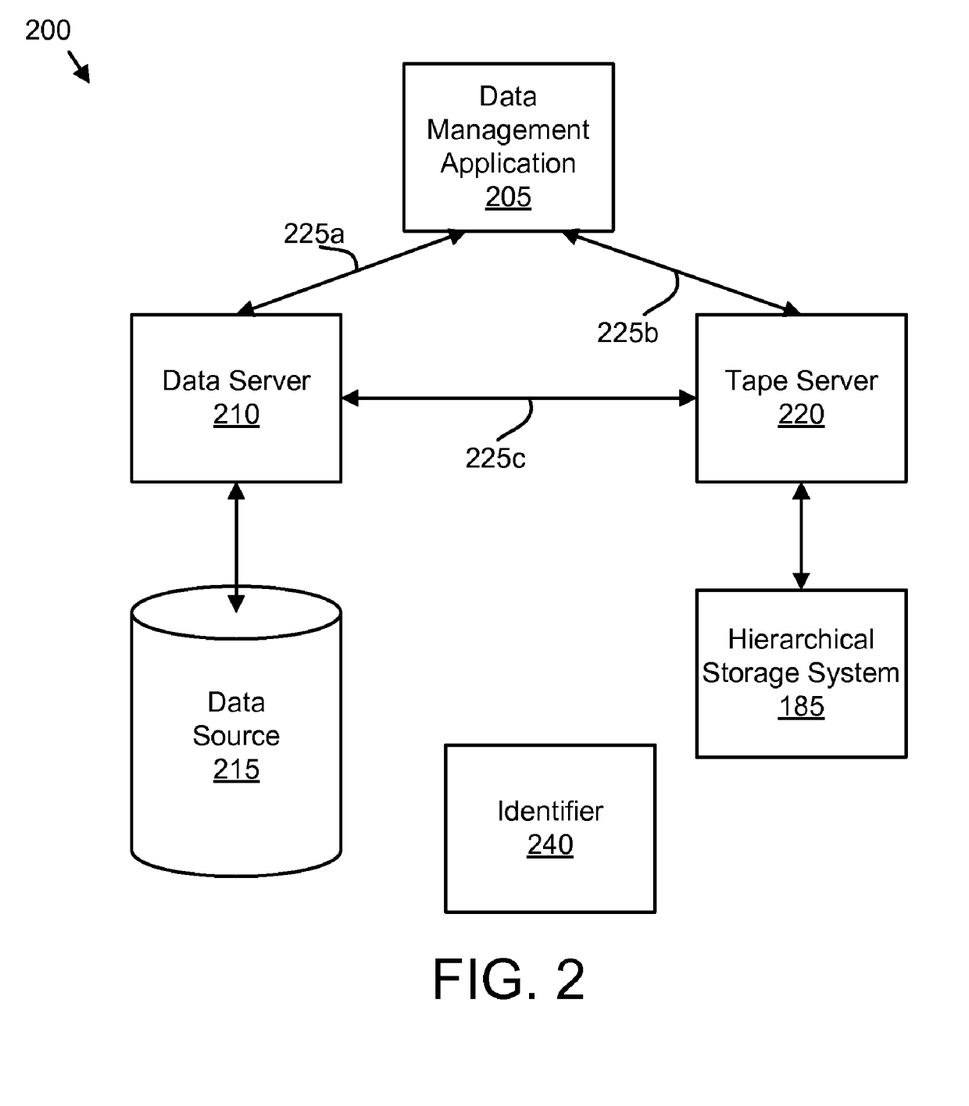
FIG. 2 is a schematic block diagram illustrating one embodiment of a backup system of the present invention.

FIG. 2 is a schematic block diagram illustrating one embodiment of a backup system 200 of the present invention. The system 200 includes a data management application 205, a data server 210, a data source 215, a tape server 220, a HSS 185, and an identifier 240. The description of the system 200 refers to elements of FIG. 1, like numbers referring to like elements.

The HSS 185 may be the HSS 185 of FIG. 1. The HSS 185 stores and manages data in a plurality of logical and physical storage locations that are organized in a hierarchy as will be described hereafter. The data is typically organized as one or more data sets. The data sets may be directories, files, volumes, databases, and the like.

The data server 210 may be a client server 110a and/or a client computer 110b. The data server 210 stores data to and retrieves data from the data source 215. The data source 215 may be an internal storage device of the data server 210 such as a hard disk drive. Alternatively, the data source 210 may be one or more storage subsystems 140 in communication with the data server 210.

In one embodiment, the tape server 220 may comprise one or more computer program products executing on the server 130. The tape server 220 is configured to comply with the NDMP. Although in one embodiment the tape server 220 stores data to a tape drive 180, the tape server 220 may store data to and retrieve data from storage devices 170 including but not limited to hard disk drives, optical storage devices, and the like embodied in the HSS 185. The data management application 205 may be configured as one or more computer program products executing on the computer 105. The data management application 205 may communicate with the data server 210 and the tape server 220 using the Transmission Control Protocol/Internet Protocol (TCP/IP) over one or more communication channels 225.

The communication channels 225 may be the Internet, local area networks (LAN), wide area networks (WAN), token ring networks, dedicated communication buses, and the like. For example, the data management application 205 residing on the computer 105 may communicate with the tape server 220 residing on the server 130 through the internal network 125 using TCP/IP. One of skill in the art will recognize that the invention may be practiced using other communication channel configurations and other communications protocols.

The data management application 205 requests a backup operation for one or more data sets, communicating with the tape server 220 and the data server 210 using the NDMP to complete the request. The data sets may be stored on the data source 215. In one embodiment, the data management application 205 sends data characteristics of the data sets to the tape server 220. The data characteristics may include an estimated size of the data sets, retention characteristics, and/or a priority of the originating data server 210 relative to other data servers.

The tape server 220 generates a unique identifier 240 for the data sets. The identifier 240 identifies the data sets within the HSS 185. The identifier 240 may be an alphanumeric string, a number, data values stored in one or more data fields, or the like. In addition, the tape server 220 transfers the data sets from the data server 210 to the HSS 185 and sends the identifier 240 to the data management application 205 in response to the request.

In a certain embodiment, the tape server 220 stores and manages the data sets within the HSS 185 in locations that are transparent to the data management application 205. The tape server 220 and data management application 205 may be logically distinct.

The data management application 205 may access the data sets through the tape server 220 using the identifier 240. For example, the data management application 205 may retrieve the data sets for restoration to the data source 215 with a request that identifies the data sets with the identifier 240. The system 200 backs up the data sets to the HSS 185, allowing the data sets to be managed within the HSS 185 transparently to the data management application 205.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
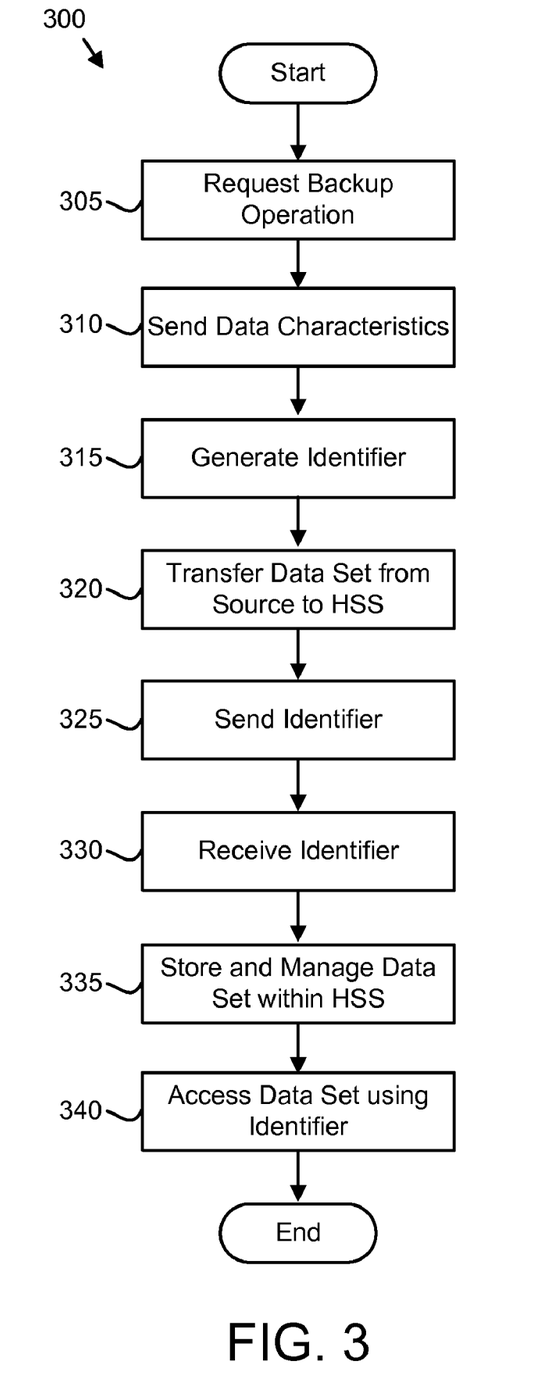
FIG. 3 is a schematic flow chart diagram illustrating one embodiment of a backup method of the present invention.

FIG. 3 is a schematic flow chart diagram illustrating one embodiment of a backup method 300 of the present invention. The method 300 substantially includes the steps to carry out the functions presented above with respect to the operation of the described system 200 of FIG. 2. The description of the method 300 refers to elements of FIGS. 1-2, like numbers referring to like elements.

In one embodiment, the method 300 is implemented with a computer program product comprising a computer readable medium having a computer readable program. The computer readable program may be integrated into a computing system, such as the computer 105 of the DPS 100, wherein the program in combination with the computing system is capable of performing the method 300.

The method 300 begins and the data management application 205 requests 305 a backup operation. The backup operation may comprise backing up a data set. Although for simplicity, the method 300 is described for one data set, the method 300 may apply to any number of data sets as is well known by those of skill in the art. The data management application 205 may communicate the request to back up the data set to the tape server 220 and the data server 210 using the NDMP.

In one embodiment, the data management application 205 requests the tape server 220 to provide a connection address. The connection address may include a Transmission Control Protocol (TCP) host and a port address for the tape server 220. The tape server 220 may communicate the connection address to the data management application 205 and/or data server 210.

In one embodiment, the data management application 205 sends 310 data characteristics of the data set to the tape server 220. For example, the data management application 205 may send 310 data characteristics that estimate the size of the data set as two gigabytes (2 GB), specify that the data set should be retained for one (1) year, and specify that the data server 210 has a high priority. The data characteristics may also identify the location of the data set within the data server 210 and/or data source 215.

The tape server 220 generates 315 the identifier 240 for the data set. In one embodiment, the identifier 240 includes alphanumeric characters, digits, or the like that specify a source of the data set, a time stamp, and the like. The identifier 240 is unique from other identifiers generated 315 by the tape server 220.

In addition, the tape server 220 transfers 320 the data set from the data server 210 to the HSS 185. The data server 210 may copy the data set to the tape server 220 and the tape server 220 accept the data set from the data server 210.

The tape server 220 sends 325 the identifier 240 to the data management application 205. The identifier 240 identifies the data set within the HSS 185 for the data management application 205. The data management application 205 does not require any other information in order to access the data set from the tape server 220.

The data management application 205 may receive 330 the identifier 240 from the tape server 220. In one embodiment, the tape server 220 stores and manages 335 the data set in locations transparent to the data management application 205. In the past, the data management application 205 retained information such as volume identifiers, tape identifiers, offsets and the like that located the data set. The data set could not be migrated or otherwise managed independently of the data management application 205 as data management application 205 would then be unable to access the data set.

The present invention allows the tape server 220 to manage 335 the data set. The tape server 220 may manage 335 the data set using processes including but not limited to retention, migration, and duplication. For example, after a period of time, the HSS 185 may migrate the data set from a low-latency, high-performance hard disk to a high-latency, low-performance hard disk. After another subsequent period of time, the HSS 185 may migrate the data set to an archival magnetic tape. The data management application 205 need not be informed of the data set migrations as the data management application 205 can still access the data set using the identifier 240.

In an alternate example, the tape server 220 may duplicate the data set as one or more data set instances within the HSS 185. Similarly, the tape server 220 may retain one or more data set instances for specified time periods.

The data management application 205 may access 340 the data set through the tape server 220 using the identifier 240. For example, the data management application 205 may request that the tape server 220 transfer the data set to the data server 210 to recover the data set, using the identifier 240 to specify the data set. The tape server 220 can retrieve the data set from the HSS 185 using the identifier 240 regardless of the location of the data set within the HSS 185.

The method 300 transparently backs up the data set to the HSS 185. In addition, the method 300 allows the data set to be stored and managed 335 transparently to the data management application 205, and to be accessed 340 using the identifier 240.

Figure 4:
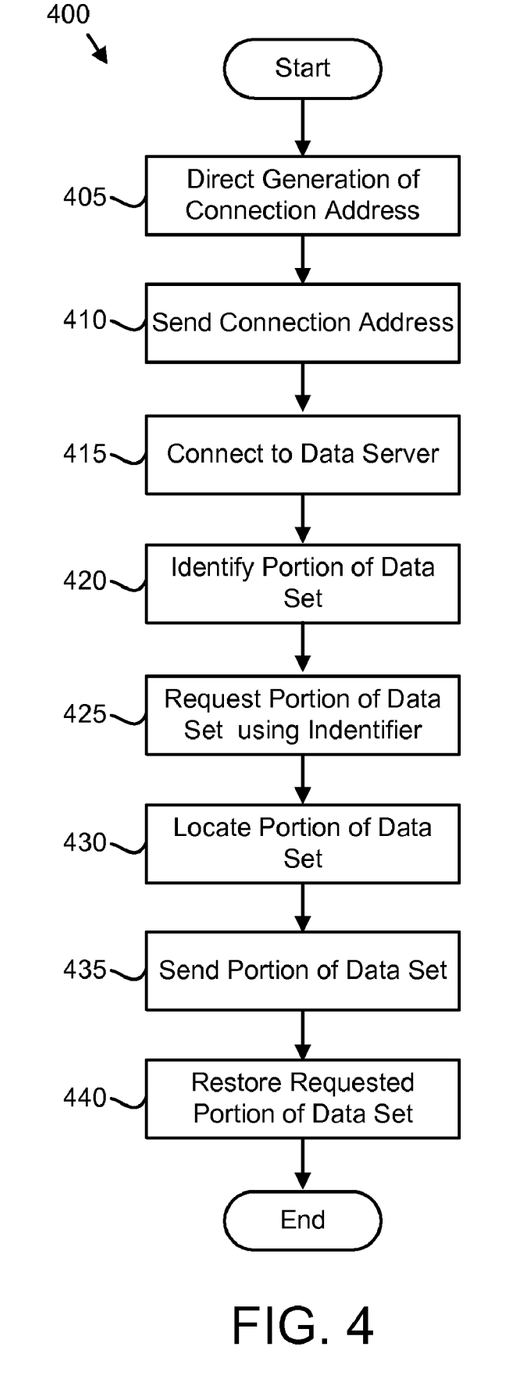
FIG. 4 is a schematic flow chart diagram illustrating one embodiment of a restoration method of the present invention.

FIG. 4 is a schematic flow chart diagram illustrating one embodiment of a restoration method of the present invention. The method 400 may embody step 340, accessing the data set using the identifier 240, of FIG. 3. The description of the method 400 refers to elements of FIGS. 1-3, like numbers referring to like elements.

In one embodiment, the method 400 is implemented with a computer program product comprising a computer readable medium having a computer readable program. The computer readable program may be integrated into a computing system, such as the computer 105 of the DPS 100, wherein the program in combination with the computing system is capable of performing the method 400.

The method 400 begins, and in one embodiment, the data management application 205 directs 405 the data server 210 to generate a connection address. In one embodiment, the connection address includes a TCP host and a port address for the data server 210. In response to the data management application's direction 405, the data server 210 may send 410 the connection address to the tape server 220.

In one embodiment, the tape server 220 connects 415 to the data server 210 at the connection address. The tape server 220 may connect 415 to the data server 210 by communicating one or more packets to the connection address.

In a certain embodiment, the data management application 205 and the data server 210 identify 420 a portion of the data set for restoration. Although as in FIG. 3, a single data set is used for simplicity, one of skill in the art will recognize that the method 400 may be applied to any number of data sets. The identified portion of the data set may be corrupted, lost, deleted, or the like. In one embodiment, the identified portion includes all of the data set.

The data management application 205 requests 425 the portion of the data set from the tape server 220 using the identifier 240, wherein the identifier 240 is the identifier 240 sent 325 as described in FIG. 3. For example, the data management application 205 may use the identifier 240 to request 425 all of the data set from the tape server 220. In an alternate example, the data management application 205 may use the identifier 240, an offset, and a data size to request 425 a specified portion of the data set from the tape server 220.

In one embodiment, the tape server 220 locates 430 the specified portion of the data set within the HSS 185 using the identifier 240 and any other identifying information such as offsets, data sizes, and the like. The identifier 240 uniquely identifies and locates the data set within the HSS 185, regardless of where the tape server 220 may logically and physically migrate the data set. For example, the identifier 240 may identify and locate the data set if stored to one or more magnetic tapes.

In a certain embodiment, the tape server 220 sends 435 the requested portion of the data set to the data server 210. The tape server 220 may send 435 the requested portion of the data set encapsulated in one or more packets.

The data server 210 may restore 440 the requested portion of the data set to the data source 215, and the method 400 ends. For example, the data server 210 may restore 440 the requested portion of the data set by overwriting a corrupted portion of a data set instance on the data source 215 with the requested portion of the data set.

The method 400 allows the data management application 205 to restore 440 portions of the data set using the identifier 240 to identify the data set. The HSS 185 may store the data set in one or more logical and/or physical locations. However, the details of the logical and/or physical locations are transparent to the data management application 205. Thus the data management and tracking functions of the data management application 205 are greatly simplified, while the tape server 220 is free to efficiently manage the data set.

Figure 5:
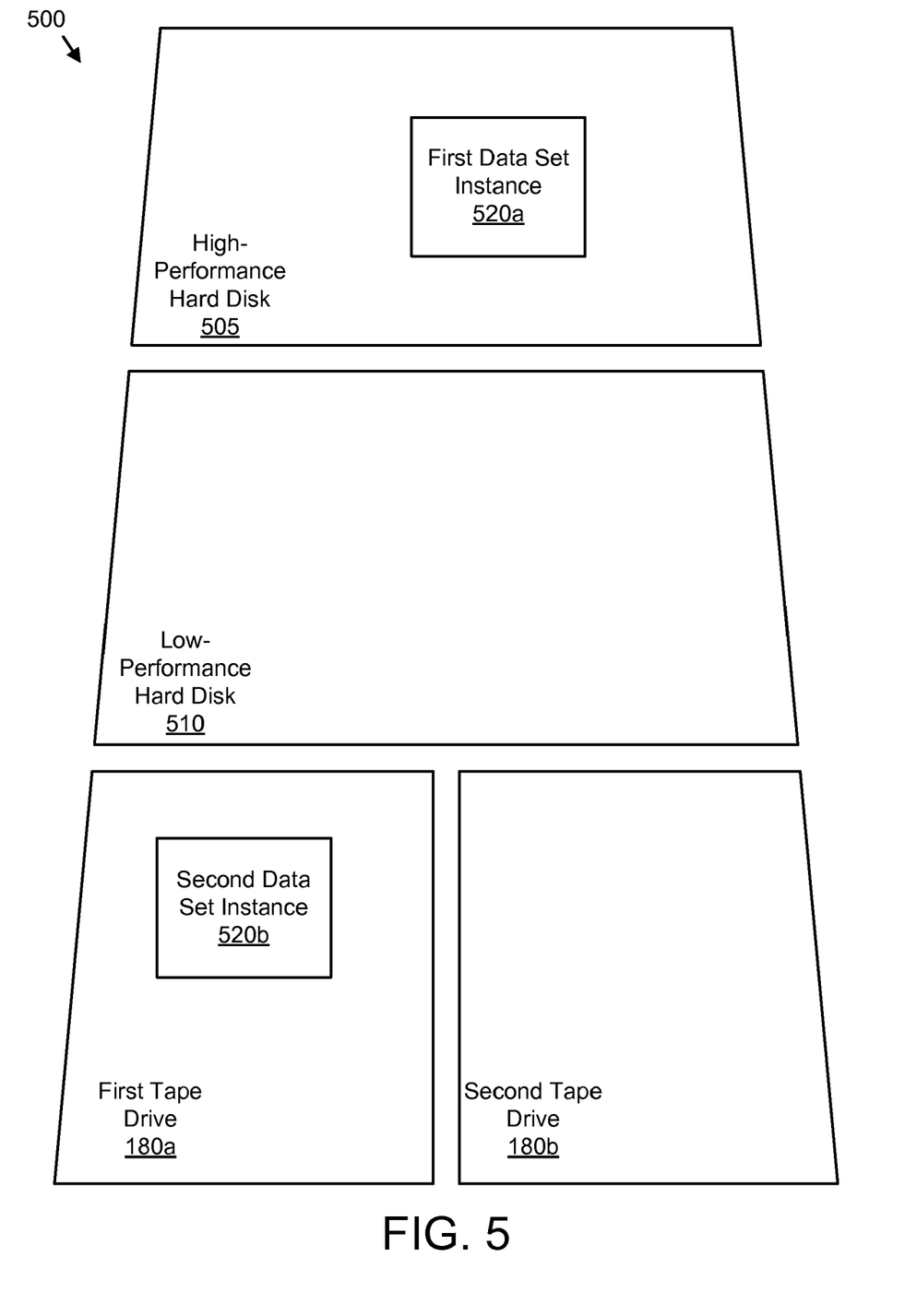
FIG. 5 is a schematic block diagram illustrating one embodiment of backing up a data set to a HSS of the present invention.

FIG. 5 is a schematic block diagram illustrating one embodiment of backing up a data set to a HSS 500 of the present invention. The depicted HSS 500 may be the HSS 185 of FIG. 1. The HSS 500 includes a high-performance hard disk 505, a low-performance hard disk 510, and one or more tape drives 180. The description of the HSS 500 may refer to elements of FIGS. 1-4, like numbers referring to like elements.

The high-performance hard disk 505 may be embodied in the storage devices 170a of a first storage subsystem 140a while the low-performance hard disk 510 may be embodied in the storage devices 170b of a second storage subsystem 140b. The high-performance hard disk 505 may have a low latency. The HSS 500 may store data sets to the high-performance hard disk 505 that are more likely to be accessed. Conversely, the low-performance hard disk 510 may have a high latency. The HSS 500 may store data set to the low-performance hard disk 510 that are less likely to be accessed.

The HSS 185 is configured to store, migrate, and manage data sets. Data sets may be stored as one or more instances in one or more logical and physical locations within the HSS 185. Although for simplicity the HSS 500 is shown with one high-performance hard disk 505, one low-performance hard disk 510, and two tape drives 180, one of skill in the art will recognize that the HSS 185 may employ a plurality of logical and physical combinations of elements including storage devices 170 and logical elements.

The tape server 220 transfers 320 a data set to the HSS 500. The HSS 500 stores the data set as a first data set instance 520a on the high-performance hard disk 505. In addition, the HSS 500 stores the data set as a second data set instance 520b on a magnetic tape through the first tape drive 180a. The first data set instance 520a may be available for rapid restoration to the data server 210 and/or data source 215. The second data set instance 520b may be archived so that the data set is cost-effectively stored for an extended period. The number and location of data set instances 520 are transparent to the data management application 205. The data management application 205 need only retain and employ the identifier 240 for the data set in order to access the data set instances 520.

Figure 6:
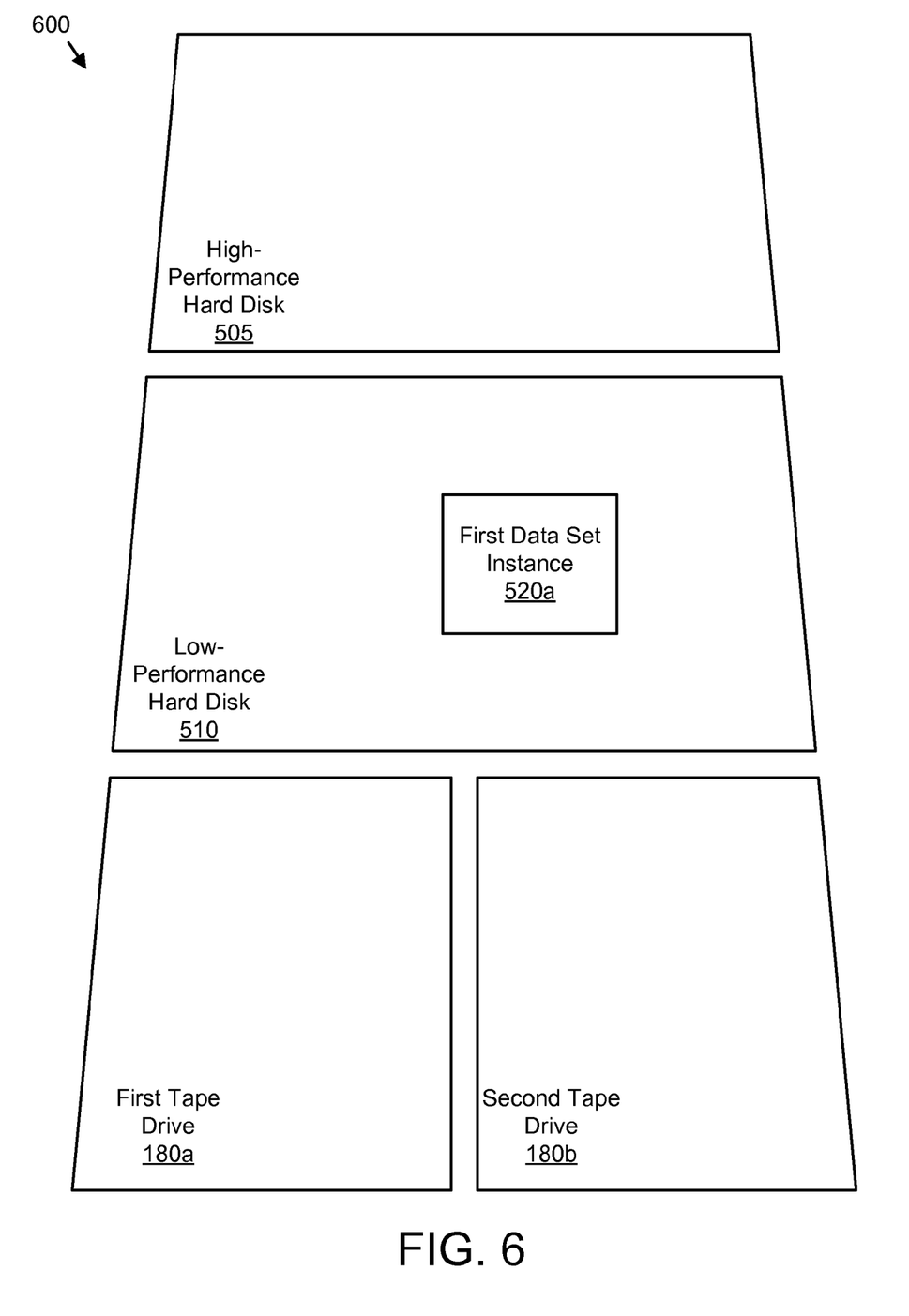
FIG. 6 is a schematic block diagram illustrating one embodiment of managing a data set within a HSS of the present invention.

FIG. 6 is a schematic block diagram illustrating one embodiment of managing a data set within a HSS 600 of the present invention. The HSS 600 is the HSS 500 of FIG. 5. The tape server 220 may store and manage 335 the data set instance 520 by migrating the first data set instance 520a from the high-performance hard disk 505 to the low-performance hard disk 510.

For example, the HSS 600 may migrate the first data set instance 520a in response to a policy. The policy may specify that data set instances 520 are migrated from the high-performance hard disk 505 one (1) week after being stored on the high-performance hard disk 505. However, the data management application 205 may still access the first data set instance 520a using the identifier 240.

The second data set instance 520b is not shown as the magnetic tape containing the second data set instance 520b is dismounted from the first tape drive 180a and archived. However, if the first data set instance 520a is unavailable, the data management application 205 may also retrieve the second data set instance 520b from the magnetic tape using the identifier 240. The tape server 220 may direct the mounting of the magnetic tape and the retrieval of the second data set instance 520b from the magnetic tape. The data management application 205 need not manage the data set instances 520 or retain location information for the data set instances 520. The data management application 205 accesses the data set instances 520 using the identifier 240.

Figure 7:
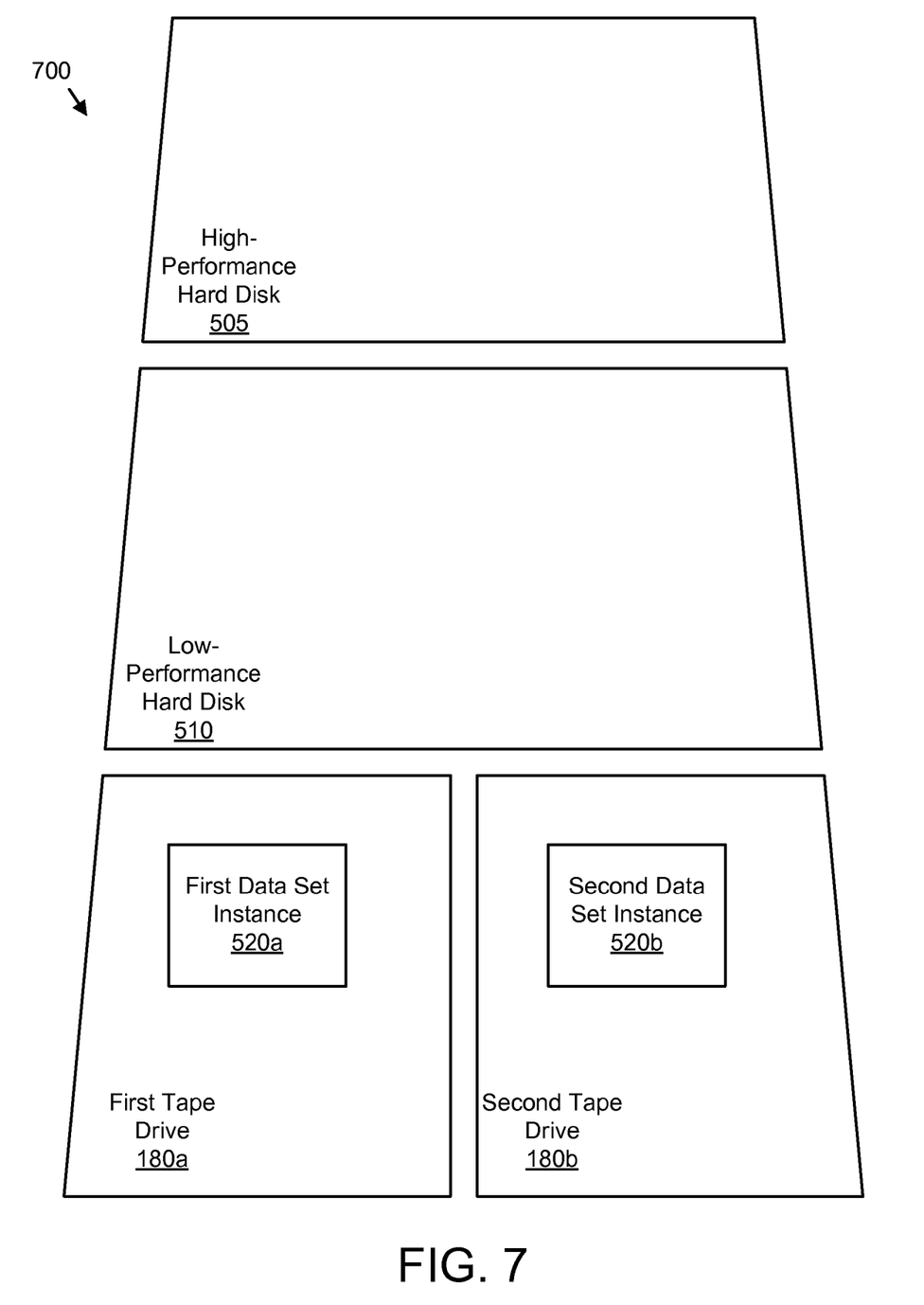
FIG. 7 is a schematic block diagram illustrating one embodiment of a concurrent copy within a HSS of the present invention.

FIG. 7 is a schematic block diagram illustrating one embodiment of a concurrent copy within a HSS 700 of the present invention. The HSS 700 includes the high-performance hard disk 505, low-performance hard disk 510, and tape drives 180 of the HSS 500, 600 of FIGS. 5 and 6. The HSS 700 initially stores 335 the data set by copying the data set to the first tape drive 180a as the first data set instance 520a and concurrently copying the data set to the second tape drive 180b as the second data set instance 520b. The HSS 700 may concurrently create the data set instances 520 on the two (2) tape drives 180 as directed by the tape server 220. The storage of the two (2) data set instances 520 to the two (2) tape drives 180 is transparent to the data management application 205.

One of skill in the art will recognize that the present invention may be practiced by copying any number of data set instances 520 to any number and any type of storage devices 170 including but not limited to tape drives 180. For example, four data set instances 520 may be copied in a single, concurrent operation to the high-performance hard disk 505, the low-performance hard-disk 510, the first tape drive 180a configured as a high-performance tape drive, and the second tape drive 180b configured as a low-performance tape drive.

The present invention allocates the task of managing multiple data set instances 520 to the tape server 220 and HSS 700 so the data management application 205 does not need to deal with the allocation task. This reduces network traffic and improves the efficiency of the DPS 100.

The embodiment of the present invention transparently backs up and manages one or more data set instances 520 of one or more data sets to the HSS 185. The data sets may be accessed using an identifier 240, so that backing up, managing, and accessing the data sets are transparent to the data management application 205. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for transparent backup to a hierarchical storage system, the method performed by a computer readable storage medium storing a computer readable program executed by at least one computer and comprising:

requesting a backup operation, communicating the request using a Network Data Management Protocol (NDMP) from a data management application to a tape server for the hierarchical storage system;

sending data characteristics of a data set from the data management application to the tape server, wherein the data characteristics comprise a data set retention interval and a data set priority;

generating a unique identifier for the data set at the tape server, the identifier comprising a source and a time stamp;

transferring the data set to the hierarchical storage system;

storing and managing the data set in locations of the hierarchical storage system transparent to the data management application;

sending the identifier from the tape server to the data management application in response to the request, wherein the identifier identifies the data set within the hierarchical storage system;

storing a plurality of instances of the data set on the hierarchical storage system, a first data set instance stored on a high-performance tape drive and a second data set instance stored on a magnetic tape drive;

restoring the data set from the high-performance tape drive to a data source using the identifier if the first data set instance is available, wherein no other information is required to restore the data set; and restoring the data set from the magnetic tape drive to the data source using the identifier if the first data set instance is unavailable, wherein no other information is required to restore the data set.

2. The method of claim 1, further comprising receiving the identifier at the data source.

3. The method of claim 1, the method further comprising managing the data set using processes selected from retention, migration, and duplication of the data set within the hierarchical storage system.

4. The method of claim 1, the method further comprising:

identifying a specified portion of the data set for restoration;

requesting the specified portion of the data set from the hierarchical storage system using the identifier, the offset for the specified portion, and the data size of the specified portion; and sending the specified portion of the data set to the data source.

5. A system for transparent backup to a hierarchical storage system, the system comprising:

the hierarchical storage system;

a data server configured to store data to a data source;

a data management application comprising a first computer storage medium storing a first computer readable program executed by a first processor and requesting a backup operation and communicating with a tape server and the data server using a Network Data Management Protocol (NDMP), the data management application sending data characteristics of a data set to the tape server to complete the request, wherein the data characteristics comprise a data set retention interval and a data set priority;

the tape server comprising a second computer storage medium storing a second computer readable program executed by a second processor and generating a unique identifier for the data set, the identifier comprising a source and a time stamp, transferring the data set from the data server to the hierarchical storage system, storing and managing the data set in locations of the hierarchical storage system transparent to the data management applicant, the tape server storing a plurality of instances of the data set on the hierarchical storage system, a first data set instance stored on a high-performance tape drive and a second data set instance stored on a magnetic tape drive, and sending the identifier to the data management application in response to the request, wherein the identifier identifies the data set within the hierarchical storage system;

the data management application further restoring the data set from the high-performance tape drive to a data source using the identifier if the first data set instance is available, wherein no other information is required to restore the data set, and restoring the data set from the magnetic tape drive to the data source using the identifier if the first data set instance is unavailable, wherein no other information is required to restore the data set.

6. The system of claim 5, wherein the tape server is logically distinct from the data management application.

7. The system of claim 5, the tape server further managing the data set using processes selected from retention, migration, and duplication of the data set within the hierarchical storage system.

8. The system of claim 5, wherein:

the data management application and data server identify a specified portion of the data set for restoration;

the data management application requests the specified portion of the data set from the tape server using the identifier, the offset for the specified portion, and the data size of the specified portion; and the tape server sends the specified portion of the data set to the data server.

9. A computer useable medium storing a computer readable program, wherein the computer readable program when executed on at least one computer causes the at least one computer to:

request a backup operation, communicating the request using a Network Data Management Protocol (NDMP) from a data management application to a tape server for the hierarchical storage system;

send data characteristics of a data set from the data management application to the tape server, wherein the data characteristics comprise a data set retention interval and a data set priority;

generate a unique identifier for the data set at the tape server, the identifier comprising a source and a time stamp;

transfer the data set to a hierarchical storage system;

store and manage the data set in locations of the hierarchical storage system transparent to the data management application;

send the identifier from the tape server to the data management application in response to the request, wherein the identifier identifies the data set within the hierarchical storage system;

store a plurality of instances of the data set on the hierarchical storage system, a first data set instance stored on a high-performance tape drive and a second data set instance stored on a magnetic tape drive;

restore the data set from the high-performance tape drive to a data source using the identifier if the first data set instance is available, wherein no other information is required to restore the data set; and restore the data set from the magnetic tape drive to the data source using the identifier if the first data set instance is unavailable, wherein no other information is required to restore the data set.

10. The computer useable medium of claim 9, wherein the computer readable code further causes the at least one computer to receive the identifier.

11. The computer useable medium of claim 9, wherein the computer readable code further causes the at least one computer to manage the data set using processes selected from retention, migration, and duplication of the data set within the hierarchical storage system.

12. The computer useable medium of claim 9, wherein the computer readable code further causes the at least one computer to:
   identify a specified portion of the data set for restoration;
   request the specified portion of the data set from the hierarchical storage system using the identifier, the offset for the specified portion, and the data size of the specified portion; and
   send the specified portion of the data set to the data source.

13. An apparatus for transparent backup to a hierarchical storage system, the apparatus comprising:
   a data management application comprising a first computer readable storage medium storing a first computer readable program executed by a first processor and requesting a backup operation and communicate with a tape server and a data server using a Network Data Management Protocol (NDMP) from the data management application to a tape server for the hierarchical storage system to complete the request, wherein the data characteristics comprise a data set retention interval and a data set priority;
   the tape server comprising a second computer storage medium storing a second computer readable program executed by a second processor and generating a unique identifier for the data set, the identifier comprising a source and a time stamp, transferring the data set from the data server to the hierarchical storage system, storing and managing the data set in locations of the hierarchical storage system transparent to the data management applicant, the tape server storing a plurality of instances of the data set on the hierarchical storage system, a first data set instance stored on a high-performance tape drive and a second data set instance stored on a magnetic tape drive, and sending the identifier to the data management application in response to the request, wherein the identifier identifies the data set within the hierarchical storage system;
   the data management application further restoring the data set from the high-performance tape drive to a data source using the identifier if the first data set instance is available, wherein no other information is required to restore the data set, and restoring the data set from the magnetic tape drive to the data source using the identifier if the first data set instance is unavailable, wherein no other information is required to restore the data set.

14. The apparatus of claim 13, the tape server storing and managing the data set in locations logically distinct from the data management application, and the data management application further receiving the identifier from the tape server.

15. The apparatus of claim 13, wherein:
   the data management application and data server identify a specified portion of the data set for restoration;
   the data management application requests the specified portion of the data set from the tape server using the identifier, the offset for the specified portion, and the data size of the specified portion; and
   the tape server sends the specified portion of the data set to the data server.

* * * * *